Sept. 9, 1969 JAMES E. WEBB 3,466,198
ADMINISTRATOR OF THE NATIONAL AERONAUTICS
AND SPACE ADMINISTRATION
SOLAR CELL MATRIX Filed Sept. 26, 1967 2 Sheets-Sheet 1

ROBERT K. YASUI
INVENTOR.

BY [signature]
J. H. Warden [signature]
ATTORNEYS

Sept. 9, 1969 JAMES E. WEBB 3,466,198

ADMINISTRATOR OF THE NATIONAL AERONAUTICS AND SPACE ADMINISTRATION

SOLAR CELL MATRIX

Filed Sept. 26, 1967 2 Sheets-Sheet 2

ROBERT K. YASUI
INVENTOR

BY

ATTORNEYS

United States Patent Office 3,466,198
Patented Sept. 9, 1969

3,466,198

SOLAR CELL MATRIX

James E. Webb, Administrator of the National Aeronautics and Space Administration, with respect to an invention of Robert K. Yasui, Los Angeles, Calif.

Filed Sept. 26, 1967, Ser. No. 670,814
Int. Cl. H01m 5/00
U.S. Cl. 136—89 8 Claims

ABSTRACT OF THE DISCLOSURE

A novel configuration of a conductor for connecting cells in parallel to form a submodule, which are in turn connected in series to form a cell matrix. The conductor has segments interconnected in series with the entire combinations flexible to provide the desired matrix flexibility. Each conductor segment has a plurality of perforated pads used to form an electrical contact with one electrode or terminal of a cell in one submodule. The segment also includes at least one contact strip used to form contact with an electrode of a cell in an adjacent submodule and thereby produce the series interconnection between submodules.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

Field of the invention

This invention generally relates to solar cells and, more particularly, to an assembly and mounting arrangement for cells to form a solar cell matrix.

Description of the prior art

The use of semiconductor materials, such as PN junction cells, to convert solar energy to electrical power is very well known. Such cells are used in commercial and military applications, as well as in space exploration. The amount of electrical power produced by the cells is directly related to the solar cells' exposed area. Since the cells are quite small, of limited surface area, a large number of cells are generally placed in side-by-side arrangement to form a matrix, whose total electrical output is designed to meet the desired output power.

Since the cells are small, with fragile terminals, mounting problems are often encountered in the fabrication of a cell matrix. Typically, after completing the assembly of a cell matrix, if one or more cells are discovered to be defective, their removal and replacement generally necessitates the removal of adjacent cells. This, in addition to the cost of fabrication, also increases the danger of damaging the adjacent cells and their subsequent replacement.

Thus, a need exists for a cell matrix assembly and mounting arrangement whereby each cell may be conveniently removed and replaced without affecting adjacent cells. Also, since solar matrices are employed in space exploration, it is desired that the assembly and mounting arrangement be sufficiently flexible to resist thermal and vibrational environments, without adversely affecting the cells. Furthermore, it is desired that the arrangement be of minimum weight, a factor most significant in the design of instruments for space exploration.

OBJECTS AND SUMMARY OF THE INVENTION

Accordingly, a primary object of this invention is to provide an improved solar cell assembly and mounting arrangement.

Another object is an assembly and mounting arrangement for a cell matrix in which each cell is removable and replaceable without disturbing adjacent cells.

Another object of the present invention is a solar cell assembly and mounting arrangement which is of substantially less weight than known, comparable cell arrays of equivalent energy conversion capacity.

A further object of the present invention is an assembly and mounting arrangement for a solar cell matrix with a maximized surface, exposed to solar energy for the matrix size.

Still a further object is the provision of a flexible solar cell matrix with improved resistance to thermal and/or vibrational stresses.

These and other objects of the invention are achieved by providing an assembly and mounting arrangement in which all the solar cells forming the matrix are coplanar, with each cell physically separated from the others, while being interconnected by means of flexible current conductive metallic strips. The invention may be utilized with mounting cells, each of which consists of a semiconductive PN junction cell which has a conductive lower surface defining one terminal. The upper surface of the cell constitutes the solar sensitive area. It includes current pickup members including one member across the top side of the upper surfae defining a second or top terminal.

The novel arrangement includes a plurality of connecting conductive strips each used to connect in parallel a group of cells, forming a submodule. The strip has a central bus bar from which flexible pads extend to electrically connect the conductive strip to the bottom terminals of the cells. Each strip also includes a plurality of sub-bus bars, each used to connect to the strip the top terminal of a cell in an adjacent submodule. The bottom side of the entire matrix is then covered by an insulating plastic sheet which defines openings through which the pads forming points of contact of each cell with the conductive strip are exposed. Thus, access is provided for disconnecting each cell of the matrix by merely separating the cell from the pads. This is accomplishable without having to disturb adjacent cells.

The invention may be employed with cells which have both terminals on the bottom side thereof to form a coplanar matrix.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
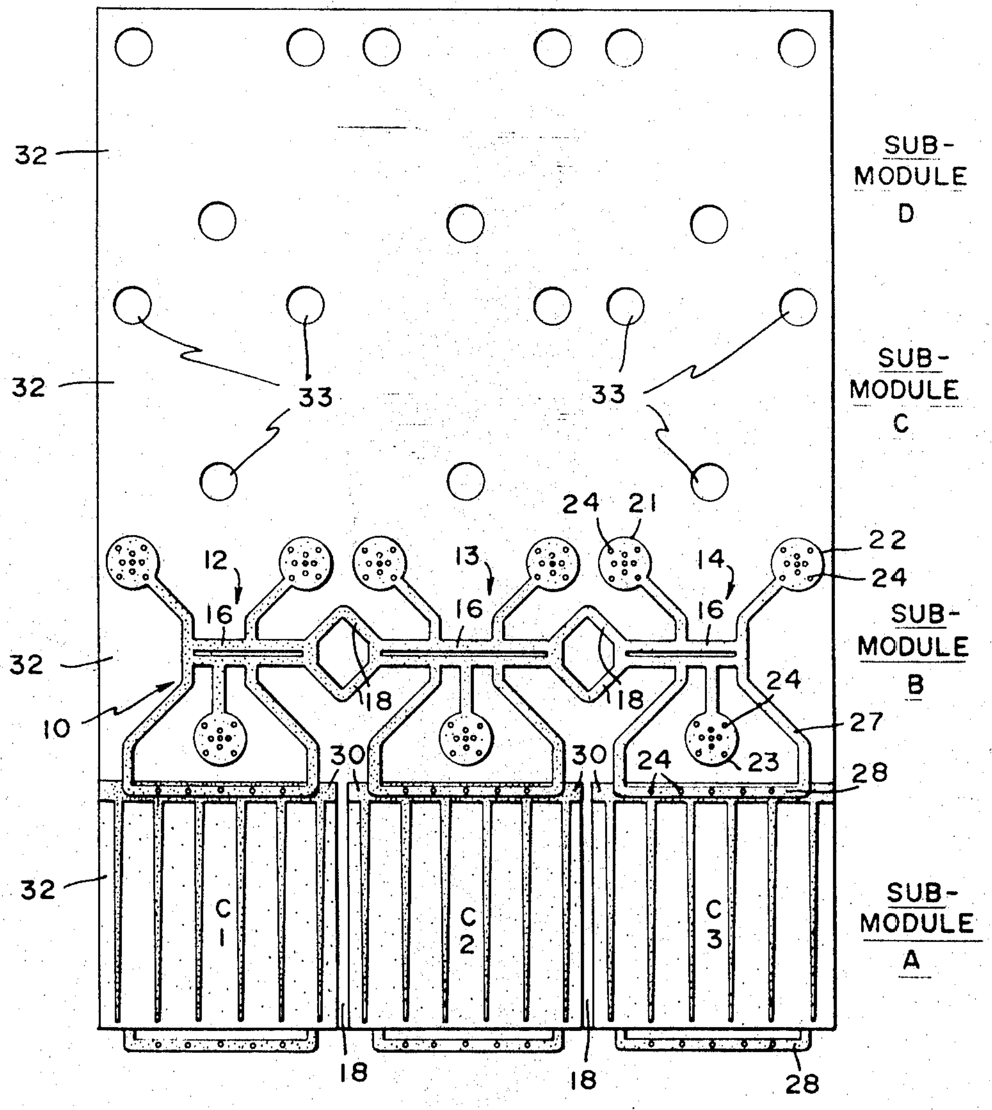
FIGURE 1 is a bottom view of a partial matrix constructed with the novel conductor of the present invention.

Reference is first made to FIGURE 1 which is a bottom view of a 12-cell matrix during an early stage of construction, in accordance with the teachings of the invention. The diagrammed matrix is assumed to consist of four submodules A, B, C and D, each of three solar cells. Only the three cells of submodule A, designated C1, C2 and C3 are shown in FIGURE 1, while of submodule B, only a submodule major electrical strip or conductor 10 is shown.

For a 3-cell submodule, conductor 10 may consist of three identical sections 12, 13 and 14, each having a central bus segment 16. Adjacent segments are interconnected by strips or conductive lines 18 to form a major bus bar which extends the length of the submodule. Preferably, each segment 16 consists of two interconnected parallel strips, with strips 18 between adjacent sections forming a square-like shape. The function of strips 18 is to provide the matrix the desired flexibility under thermal and vibrational stresses.

Each conductor section further includes a plurality of conductive pads which extend from the central segment 16. In FIGURE 1, three such pads are shown, two designated 21 and 22, extending from the upper strip of segment 16 and one, designated 23, from the lower segment strip. Each pad, shown as circularly shaped, is preferably perforated by holes 24 to permit ease of fluxing and soldering of the pad to the bottom surface of a cell.

In addition, each conductor section defines a conductive loop 27 surrounding pad 23, with a portion of the loop forming a strip 28 which is parallel to the segment 16. The function of strip 28 is to provide contact with the conductive terminal on the top of a cell in an adjacent lower submodule, such as C3 of submodule A. Like the pads, strip 28 is perforated with apertures 24 to permit ease of fluxing and soldering to the cell's top terminal.

The conductors 10 from the various submodules are preferably made to be quite thin, flexible and of a solderable metal so that their contribution to the total matrix weight is small and to facilitate the soldering of the cells to the pads and the strips 28. The conductors could be easily and relatively inexpensively chemically etched out of a sheet of metal of copper or the like.

In practice, the cells of the lowest submodule, such as A are first soldered to a conductor 10, by soldering the back side or bottom terminal of each cell to the three pads of one of the sections. Then, the conductor 10 of an upper submodule (such as B) is placed in position and strips 28 soldered to the top terminals of the cells in the lower submodule. In FIGURE 1, the top terminals are designated by numeral 30. Thereafter, the cells of submodule B are soldered to their respective conductor 10 and so on until all the cells are soldered in position. This results in a matrix in which all cells of each submodule are connected in parallel with the submodules in series.

Preferably after the cells of each submodule are soldered to their submodule conductor 10, the bottom side of the submodule is bonded to a thin insulation sheet of material, designated in FIGURE 1 by 32. It is designed to protect the conductor's pads and the cells' bottom surfaces. Sheet 32 has holes 33 punched therein. The spacings between holes conforms to the spacings between the various circular pads of the conductor. The purpose of holes 33 is to provide access to the pads for subsequent cell unsoldering without having to remove the sheet 32. The sheet 32 with the submodule thereon is then bonded or otherwise attached to a matrix insulating board, designed to protect the circular pads, exposed through holes 33.

Where the matrix might be subjected to severe stress, a metal plate may be placed below the matrix insulating board. It should however be pointed out that even in the absence of such a metal plate, the particular shape of conductor 10 of each submodule, minimizes the danger of damage to the cells due to flexing or tensile stress. This may be appreciated by again referring to FIGURE 1, wherein it is seen that very small portions of strips 18, in submodule A, are exposed between adjacent cells C1 and C2 and C2 and C3. Should the submodule be subjected to a flexing stress, the probabilities favor the flexing to take place at these points, thus minimizing possible damage to the cells.

Figure 2:
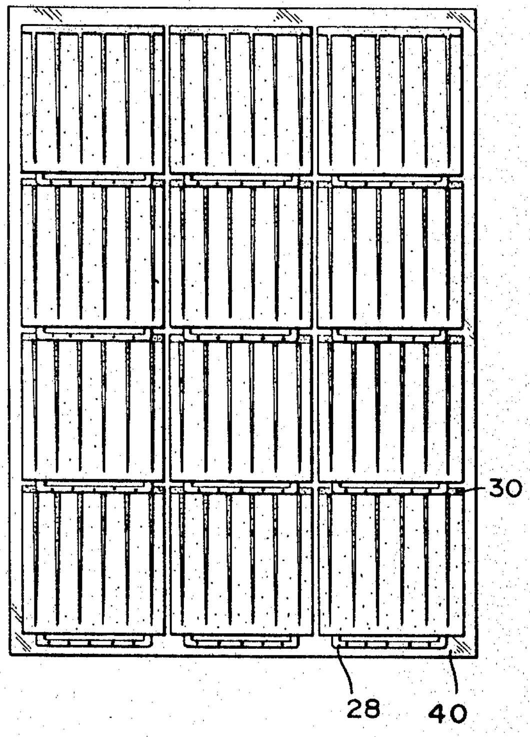
FIGURES 2 and 3 are top and bottom plan views respectively of a four submodule matrix.
Figure 3:
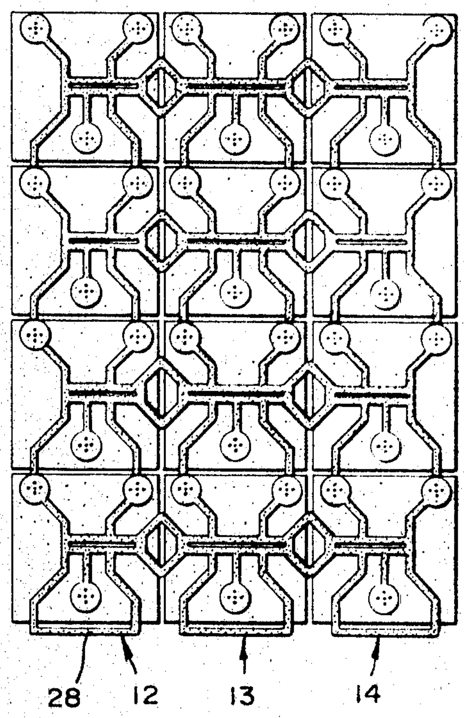

Reference is now made to FIGURES 2 and 3. FIGURE 2 is a plan top view of the 4-submodule matrix shown mounted on a matrix insulating board 40, while FIGURE 3 is a plan bottom view of the matrix with board 40 and the insulation sheets 32 removed therefrom. From these figures, it should be appreciated that each cell is separately mounted without overlapping adjacent cells. Thus, the solar sensitive area of each cell is exposed, thereby maximizing the power which the matrix can produce. Any connections made on the top side of the matrix are between the cells' top terminals 30 and strips 28 of conductors 10, leaving the entire solar sensitive areas exposed to solar energy. This is not the case in prior art matrices in which shingled structures are employed. That is, some cell overlapping is required which reduces the overall solar sensitivity matrix area.

Furthermore, by utilizing the novel conductors 10, each cell in the matrix mounted on the novel arrangement of the present invention may be easily removed and replaced without affecting any of the adjacent cells. This aspect may best be explained by considering the following explanation.

To remove a defective cell, the matrix board 40 is first removed exposing through sheets 32 the circular pads to which each cell is connected. The pad 24 to which the defective cell is connected is then heated through a hole 33, such as with a soldering iron, while the front bottom part of the cell is gently lifted. Since the conductors 10 are quite flexible and the cells do not overlap, this can be accomplished quite easily. After pad 23 is separated, pads 21 and 22 are successively separated from the cell while the cell is lifted up. As a last step, the strip 28 of an adjacent conductor 10 to which top terminal 30 of the defective cell is connected is heated and the cell is pulled out from under it and removed. It is replaced by reversing the removal process.

There has accordingly been shown and described a novel assembly and mounting arrangement for a solar matrix. Novel conductors are utilized, each one used to support the cells of a submodule. The back of each cell is soldered to a plurality of pads with the top electrode connected to a conductive strip, forming part of the conductor of an adjacent submodule. The cells do not overlap, thereby maximizing the solar sensitive area of the matrix. Also, the pads are conveniently exposable for easy removal and replacement of any cell. The conductors are flexible wth portions exposed between mounted cells to absorb flexing stresses. The use of the flexible, lightweight conductors lend themselves to semiautomatic soldering techniques, which reduce the cost of matrix manufacturing.

Herebefore, the invention has been described in conjunction with cells, each one of which has one terminal or electrode on the top and one on the bottom. In such an arrangement, each conductor is soldered to the bottoms of cells in one submodule and to the top electrodes of the cells in an adjacent submodule. This is easily accomplished because of the flexibility of the conductors 10. However, it should be apparent that the same conductors could be used with cells which have both electrodes on the bottom side. Such an arrangement results in a perfect coplanar matrix.

Figure 4:
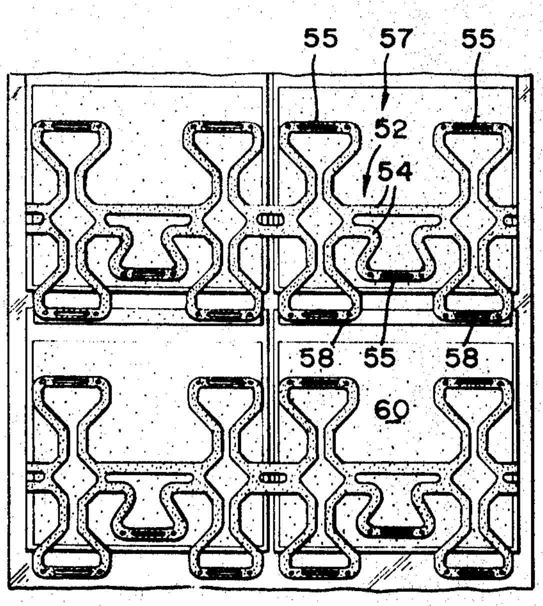
FIGURE 4 is a bottom view of a two submodule matrix with a different configuration of the novel conductor of the invention.

Furthermore, it should be appreciated that the specific arrangement of conductor 10 herebefore described may be modified without departing from the spirit of the invention. For example, as seen from FIGURE 4, to which reference is made herein, each conductor section, such as 52, may include a double line central bus segment 54 forming three slotted contact strips 55. These are used to form an electrical contact with one electrode of a cell such as 57. Also each conductor section includes two additional slotted and/or perforated contact strips 58, used to form contact with a second electrode of an adjacent cell 60. It should be noted that in FIGURE 4, each of cells 57 and 60 has its two electrodes on the same side. In FIGURE 4, strips 55 correspond to pads 21, 22, and 23 of FIGURE 1. Thus, the word "pad" should be interpreted in its broadest sense to include the strips 55. Similarly, strips 58 correspond to strips 28 and therefore the term "conductive strip" should be interpreted to include one or more strips.

It is appreciated that those familiar with the art may make modifications and/or substitute equivalents in the arrangements as shown without departing from the spirit of the invention. Therefore, all such modifications and/or equivalents are deemed to fall within the scope of the invention as claimed in the appended claims.

I claim:

1. In a cell matrix of the type including a plurality of cells arranged in a plurality of rows, wherein the cells in each row are connected in parallel and each row is connected in series with an adjacent row, each cell having a bottom side defining a first terminal and a top side having one edge defining a second terminal, the improvement comprising:

a conductor strip associated with each row of cells, said strip including a number of sections equal to the number of cells in the row, each section having a main conductive segment parallel to the row of cells, a plurality of pads, all independently electrically connectable to the first terminal of a cell and a conductive member extending from said main conductive segment, said conductive member having a portion parallel to the main conductive segment for electrically connecting to the second terminal of a cell in an adjacent row; and means for flexibly interconnecting adjacent sections of said conductor strip.

2. The improvement as recited in claim 1 wherein in each section of said conductor strip the pads and the portion of said conductive member which is parallel to the main conductive segment are perforated to facilitate the soldering of said pads and said portion to cell terminals.

3. The improvement as recited in claim 2 further including a sheet of insulating material for each row of cells, said sheet defining apertures for exposing the pads connected to the first terminals of the cells in the row.

4. A solar cell matrix comprising:

solar cells arranged in coplanar adjacent rows, each row including a plurality of side-by-side coplanar cells;

a separate flexible electrical conductor associated with each row of cells, for electrically interconnecting the bottom sides of the cells in the row with portions of the upper sides of cells in an adjacent row, said conductor defining a main bus extending parallel to said row along the bottom sides of the cells, a plurality of groups of flexible pads extending from said main bus, each group electrically connected to the bottom side of a different cell, and a plurality of flexible conductive strips extending from said main bus, each strip to overlie and electrically engage the portion of the upper side of a cell in an adjacent row.

5. The matrix as recited in claim 4 further including a sheet of insulating material in contact with the electrical conductors and the bottom sides of said cells, said sheet defining apertures through which the group of pads electrically connected to each cell is exposed.

6. The matrix as recited in claim 5 wherein at least the pads define perforated openings to facilitate the soldering of each pad to the bottom side of a cell.

7. The matrix as recited in claim 6 wherein each group of pads includes at least two pads, one of which extends from one side of said main bus and another from the opposite side of said bus, whereby the bus extends across the bottom side of each cell in a row between pads electrically connected to the cell's bottom side.

8. The matrix as recited in claim 7 wherein said conductor defines a plurality of flexible conducting loops extending from one side thereof, a portion of each loop defining said strip to overlie and engage a cell in an adjacent matrix, said loop surrounding at least one pad.

References Cited

UNITED STATES PATENTS

| | | | |
|---|---|---|---|
| 2,428,537 | 10/1947 | Veszi et al. | 136—89 |
| 3,070,699 | 12/1962 | Lehmann | 136—89 X |
| 3,094,439 | 6/1963 | Mann et al. | 136—89 |

FOREIGN PATENTS

| | | |
|---|---|---|
| 1,373,773 | 10/1964 | France. |

ALLEN B. CURTIS, Primary Examiner